Nov. 30, 1926.
H. ANDERSON
1,608,712
MIXING MACHINE
Filed Nov. 6, 1925  6 Sheets-Sheet 5
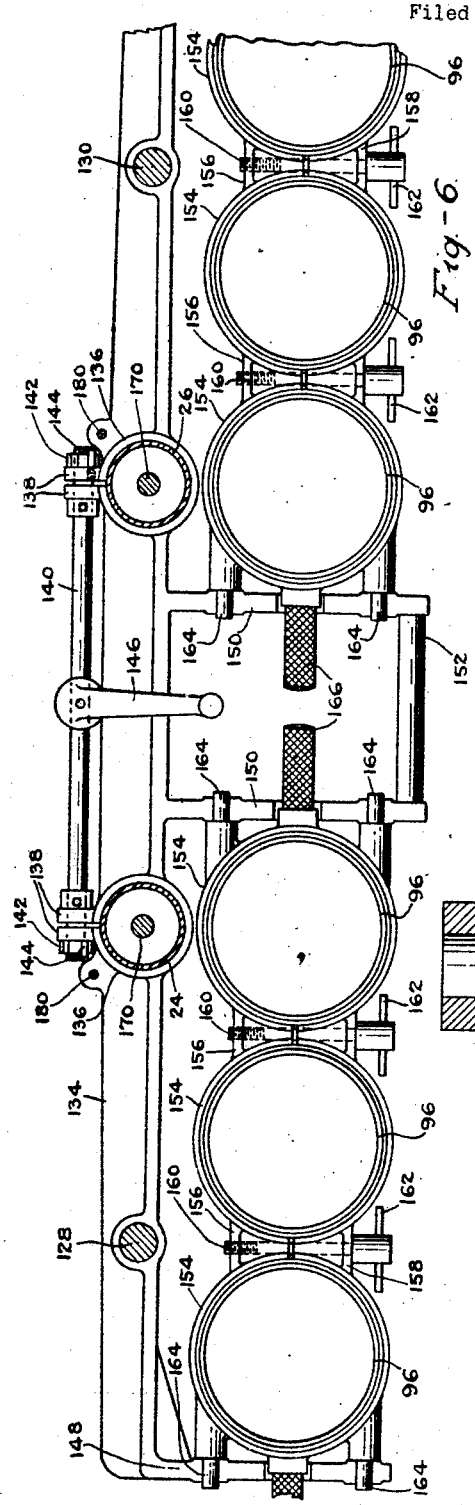
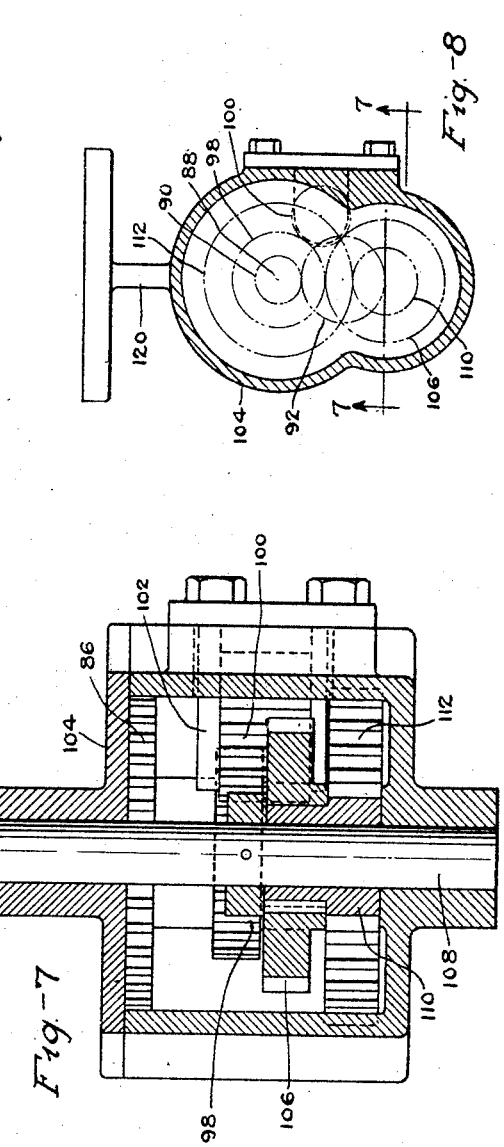
Inventor:
H. Anderson
By Whiteley and Ruckman
Attorneys

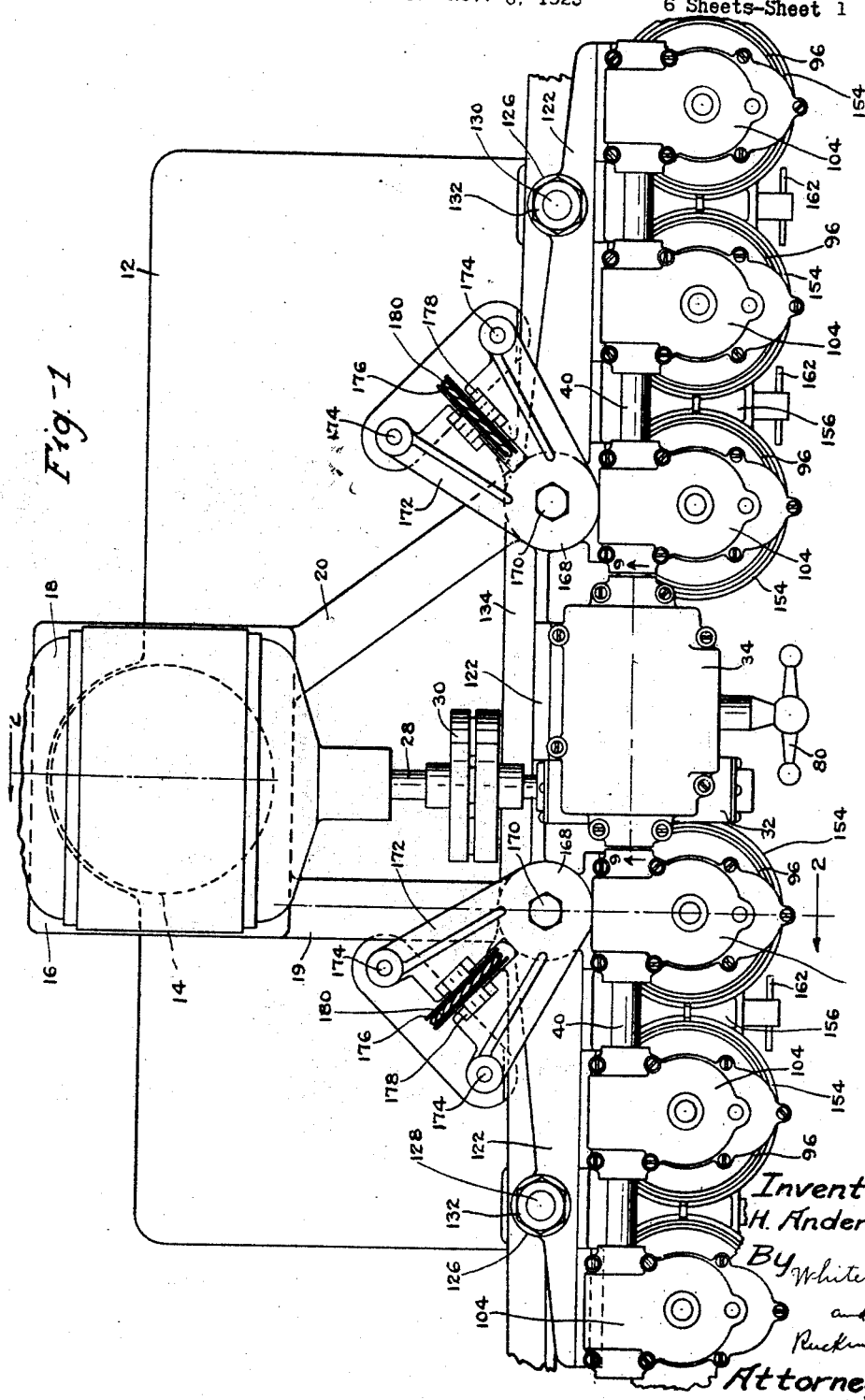

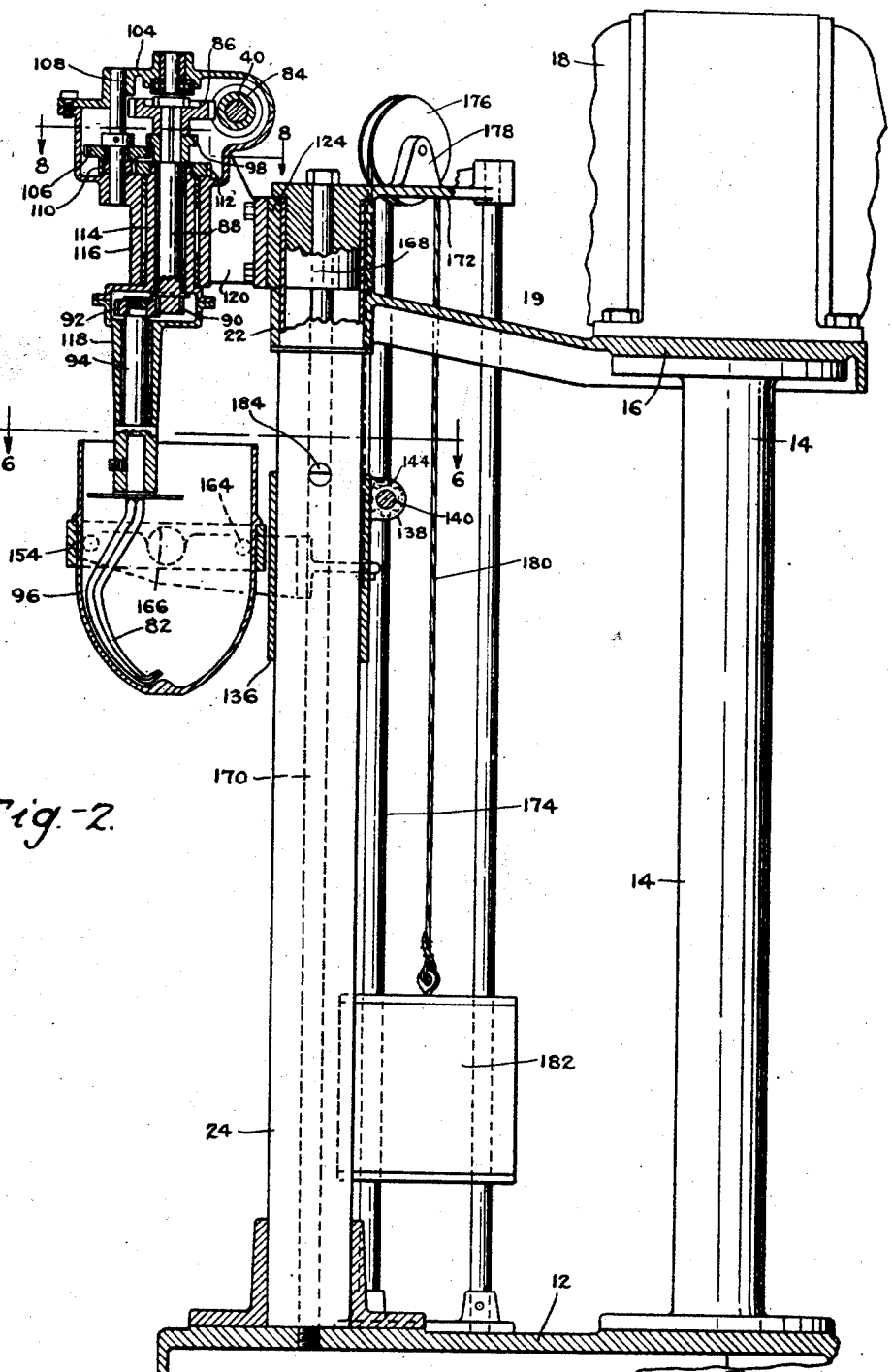

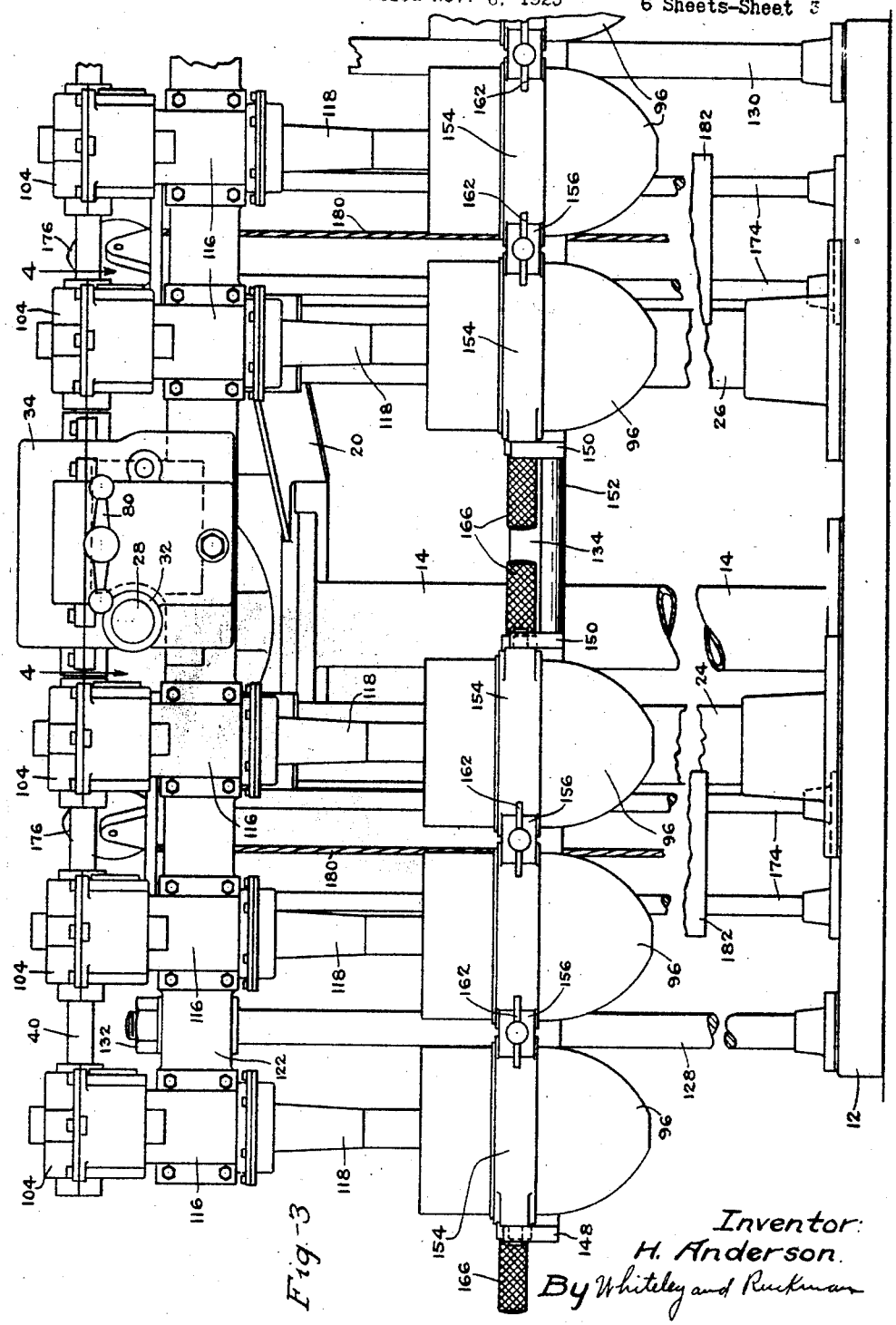

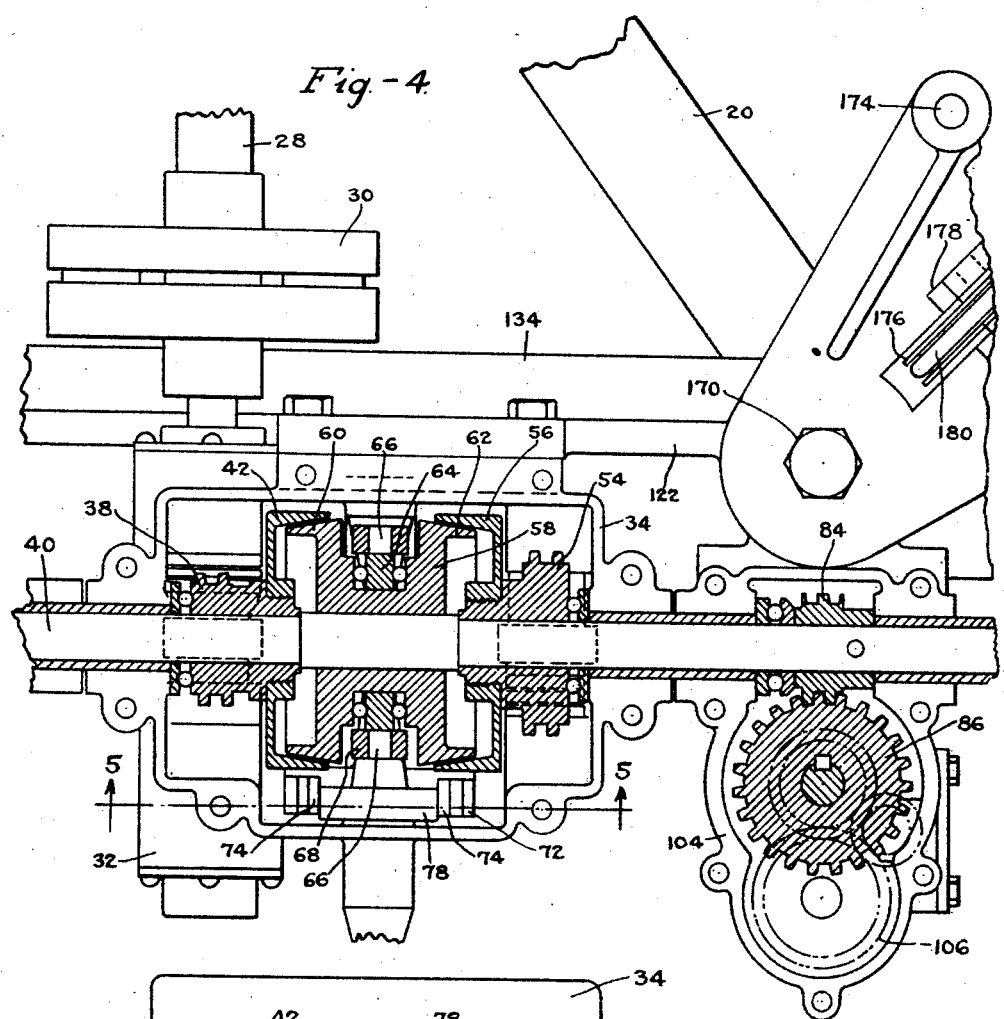
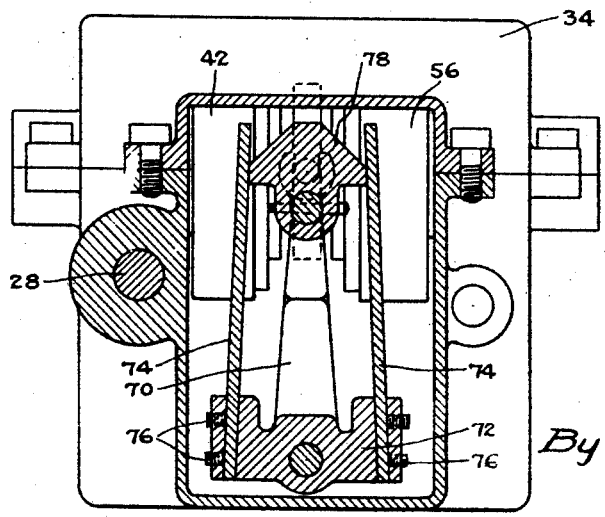

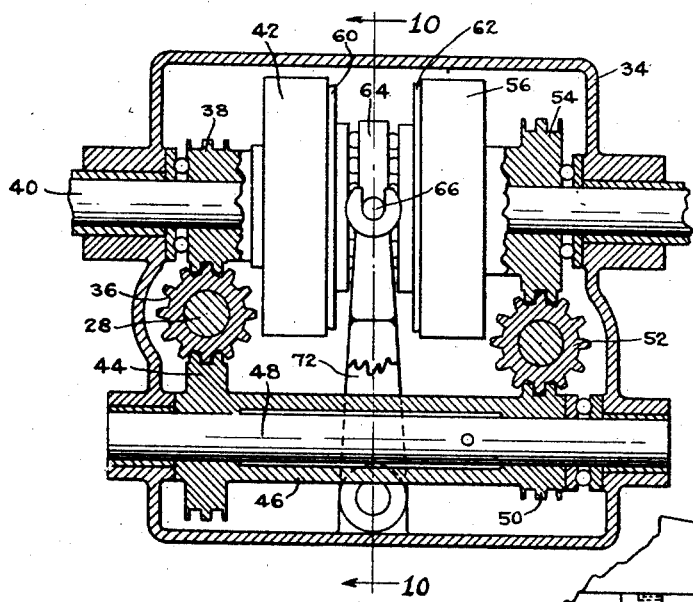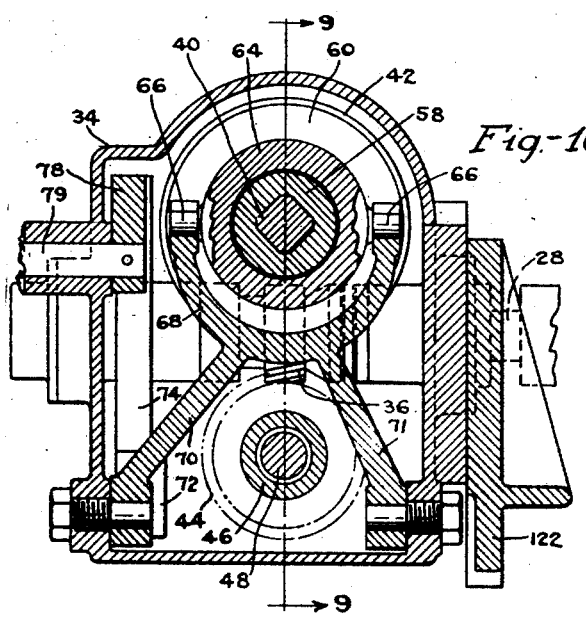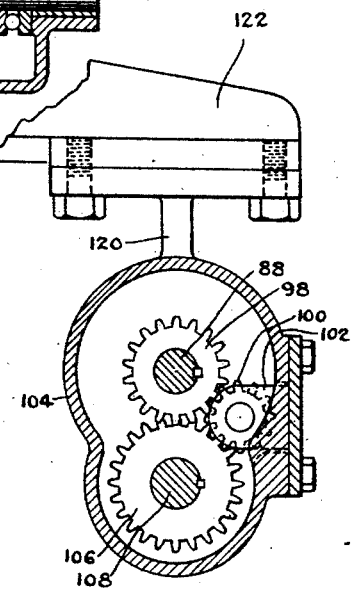

Patented Nov. 30, 1926.

1,608,712

UNITED STATES PATENT OFFICE.

HELMER ANDERSON, OF MINNEAPOLIS, MINNESOTA.

MIXING MACHINE.

Application filed November 6, 1925. Serial No. 67,304.

My invention relates to mixing machines and an object is to provide a machine which will efficiently mix various materials such as dough. Other objects are to provide a machine having mixing arms which are given a combined movement of rotation and revolution in the receptacles containing the material to be mixed, to provide a carrying member for the receptacles which can be readily removed from and replaced in proper position with relation to the mixing arms and to provide a motor drive embodying a speed-changing device so that the mixing arms can be driven at either high or low speed.

The full objects and advantages of my invention will appear in connection with the detailed description thereof, and the novel features embodied in my inventive idea will be particularly pointed out in the claims.

In the accompanying drawings which illustrate a practical embodiment of my invention,—

Fig. 1 is a top plan view of the machine. Fig. 2 is a view in vertical section on the line 2—2 of Fig. 1. Fig. 3 is a front elevational view. Fig. 4 is a view in horizontal section on the line 4—4 of Fig. 3. Fig. 5 is a view in vertical section on the line 5—5 of Fig. 4. Fig. 6 is a view in horizontal section on the line 6—6 of Fig. 2. Fig. 7 is a view in vertical section on the line 7—7 of Fig. 8. Fig. 8 is a view in horizontal section on the line 8—8 of Fig. 2 showing the position of gears which lie in different planes in dotted lines. Fig. 9 is a longitudinal view through a gear box substantially in section on the line 9—9 of Figs. 1 and 10. Fig. 10 is a view in section on the line 10—10 of Fig. 9. Fig. 11 is a view corresponding to Fig. 8 but showing in full lines only those gears which lie in the plane on which the section is taken.

Referring to the construction shown in the drawings, it will be understood from Fig. 2 that I provide a base plate 12 from which a standard 14 extends upwardly. Mounted on the top of this standard is a plate 16 upon which a motor 18 is mounted, this motor preferably being an electric motor. The plate 16 is provided with two arms 19 and 20. As shown in Fig. 1, the arm 19 extends directly forward and the arm 20 extends in an inclined position for a purpose which will presently appear. As will be understood from Fig. 2, the forward ends of the arms 19 and 20 are provided with ring members 22 which respectively encircle tubular posts 24 and 26 whose lower ends rest upon the base plate 12. The motor shaft 28 extends forwardly and for convenience is provided intermediate its length with a coupling 30, the front end of this shaft being mounted in a bearing 32 at the front of a gear box 34. As best shown in Fig. 9, this shaft extends through the gear box 34 near one end thereof. Secured to the shaft 28 within the gear box is a spiral gear 36 which meshes with a spiral gear 38 loose on a shaft 40. Secured to the gear 38 is a clutch member 42 as best shown in Fig. 4. The spiral gear 36 also meshes with a spiral gear 44 carried by one end of a sleeve 46 which is rotatably mounted on a rod 48 secured in the lower portion of the gear box. The other end of the sleeve 46 carries a spiral gear 50 meshing with an idler spiral gear 52 which in turn meshes with a spiral gear 54 loose on the shaft 40. Secured to the gear 54 is a clutch member 56 oppositely disposed with relation to the clutch member 42. Slidably mounted on the shaft 40 between the two clutch members 42 and 56 is a cooperating clutch member 58 having oppositely disposed clutch surfaces 60 and 62 for engagement respectively with the interior of the clutch members 42 and 56. The clutch member 58 between the two clutch surfaces thereon is provided with an annular groove in which is a ring member 64 having two projections 66 extending out at diametrically opposite points. These projections rest in sockets formed in the two branches of a shifting fork 68 having two downwardly extending arms 70 and 71 pivotally attached within the lower portion of the gear box as shown in Fig. 10. It is evident that when the clutch member 58 is in its middle or neutral position as shown in Figs. 4 and 9, there will be no engagement with either of the clutch members 42 and 56 and the shaft 40 will not be driven. In order to shift the clutch member 58 toward one side or the other a swinging block 72 is connected with the arm 70 of the fork and two upwardly extending fingers 74 are secured to the block 72. As shown in Fig. 5, the lower ends of these fingers extend into slots formed in the ends of the block 72 and are secured by set screws 76. Interposed between the upper ends of the two spring fingers 74 is a cam member 78 secured to a rod 79 as shown in Fig. 10, and to which a handle 80 is attached so that by turning the latter in the proper direction, the clutch member 58 may be moved either toward the right or left. When the clutch member 58 is moved to the left from its position shown in Fig. 9, the shaft 40 will be driven at high speed since it is operated directly by engagement of the gear 36 with the gear 38 which is now clutched to the shaft 40. When the clutch member 58 is moved into right hand engagement, the shaft 40 will be driven at low speed since it is now operated through the gears 36 and 44, the sleeve 46, and the gears 50, 52 and 54, the latter gear being now clutched to the shaft 40. It will be noted that the gear 44 is considerably larger than the gear 50 whereby a reduction gearing is produced. The shaft 40 operates a plurality of independently acting mixing arms 82 such as shown in Fig. 2.

It will be understood from Fig. 1 that in the embodiment illustrated, there are six of the arms 82, three of which are spaced outwardly from each of the two opposite ends of the gear box 34. The fact that the gear box is mostly at the right of the motor shaft is the reason why the arm 20 is inclined toward the right as will be understood from Fig. 1. In Fig. 2, a spiral gear 84 is shown secured to the shaft 40. It will be understood that there are six of these gears secured at spaced intervals along the shaft 40 and that since the mechanism operated by such gears are all alike, a description of one of them will be sufficient. A spiral gear 84 meshes with a spiral gear 86 secured to a shaft 88. Secured to the lower end of the shaft 88 is a gear 90 meshing with a gear 92 secured to the upper end of a shaft 94 which at its lower end has a socket for receiving the shank of the mixing arm 82. The connections thus far described produce simple rotation of the arm 82 in a receptacle 96. The arm 82 is, however, also caused to revolve around in the receptacle by mechanism now to be described. Secured to the shaft 88 beneath the gear 86 is a gear 98 which meshes with a gear 100 rotatably supported by a bracket 102 attached to the inside of a gear case 104. By referring to Fig. 7, it will be seen that the gear 100 is about twice the height of the gear 98 so that it can also mesh with a gear 106 secured to a shaft 108 mounted in the gear case 104. Secured to the shaft 108 below the gear 106 is a smaller gear 110 which meshes with a gear 112 secured to the upper end of a sleeve 114 which is rotatable around the shaft 88 and is rotatable in a tubular member 116 depending from the gear case 104. The sleeve 114 below the tube 116 is off-set and carries a tubular member 118 within which the shaft 94 previously referred to is rotatably mounted. As shown in Fig. 2, the mixing arm 82 is angular in cross section and is bowed outwardly from an axial line drawn through the shank and the lower end. The combined movement of rotation and revolution previously mentioned therefore refers to the axis of the mixing arm. The arrangement of gearing is such that the two movements are both in the same direction. For example, when the axis is rotated counterclockwise, its revolving movement will also be counterclockwise. It will be understood that the bowing of the body portion of the arm also affects the movement of this portion of the arm and that instead of merely revolving around in the receptacle, it moves in a compound curve whose component parts alternately approach and recede from the interior of the wall of the receptacle. In the embodiment shown, the lower end of the mixing arm instead of stopping abruptly is turned up slightly and the lowermost point of the arm revolves around in an annular depression in the bottom of the receptacle. The gear cases 104 are supported by brackets 120 extending rearwardly therefrom and attached to a beam 122 to which the gear box 34 is also attached. The beam 122 has two ringlike portions 124 which surround the upper ends of the posts 24 and 26 above the ring members 22. The beam 122 also has two ringlike portions 126 through which rods 128 and 130 pass, the upper ends of these rods being provided with nuts 132 and the lower ends of the rods being secured to the base plate 12. Below the beam 122 is another beam 134 which is slidable on the posts 24 and 26 and on the rods 128 and 130 as will be understood from Fig. 6, in which the beam is shown as having split ring portions 136 which surround the posts 24 and 26. The ends of the split rings 136 are provided with ears 138 through which a rod 140 passes. This rod has screw-threaded ends for receiving notched nuts 142 which are prevented from rotating by pins 144 carried by the ears 138. Each of these pins engages in one of the notches of the nut which is associated therewith. Secured to the rod 140 is a handle member 146 by means of which the rod 140 may be turned to tighten and loosen the split portions 136 whereby the beam 134 may be clamped or may be unclamped so that it can be slid up and down. This beam has four forwardly extending arms, there being two of these arms indicated at 148 at the ends of the beam and two arms marked 150 in spaced relation near the middle of the beam and connected by a rod 152 which may be grasped for sliding the beam. The arms 148 and 150 serve to support two carrying members, each of which in the embodiment shown comprises three split rings 154, the ends of which carry cooperating clamping members 156 and 158 through each pair of which passes a rod 160 threaded at the rear end and having a handle 162 on the front end whereby the receptacles 96 may be clamped within and unclamped from the rings 154. The carrying members at their ends have pairs of projections 164 adapted to rest in notches in the arms 148 and 150. Between the projections 164, the carrying members are provided with handles 166 by means of which they may be lifted from the beam 134 when the latter is in lowered position. The manner in which the beam is normally held upwardly in proper position for the mixing operation will now be described. As shown in Fig. 2, cylindrical members 168 extend into the upper ends of the posts 24 and 26. Rods 170 headed at their upper ends extend through the cylindrical members 168 and at their lower ends are threaded into the base plate 12. As best shown in Figs. 1 and 4, the cylindrical members have triangular extensions 172 through one corner of which the rods 170 pass, the other two corners being connected by rods 174 with the base plate 12. The extensions 172 are provided with slots to accommodate sheaves 176 rotatably supported by lugs 178. Cables 180 passing over the sheaves have counter weights 182 secured to one of their ends, the other ends being secured to the beam 134. The posts 24 and 26 are provided with stops 184 as shown in Fig. 2 which limit the extent to which the counter weights can move the beam 134 upwardly in order that the receptacles 96 may be maintained in proper position for the operation of the mixing arms 82 therein.

The operation and advantages of my invention will be understood in connection with the foregoing description. When the beam 134 is in lowered position, it may be held in this position by turning the handle 146 in the proper direction. The two carrying members which support the receptacles 96 may now be removed upon grasping the handles 166 and the mixed material may be carried to the desired place. Upon turning the handles 162, the receptacles 96 may be readily removed from the carrying members. The same or other carrying members supporting the receptacles containing the material to be mixed may be now placed upon the projections of the beam 134 and the latter when unclamped will be lifted by the counterweights so as to bring the receptacles into position for the mixing operation. When the motor is running, the mixing arms 82 are given a combined movement of rotation and revolution in the receptacles by the gear mechanism previously described and the material will be thoroughly mixed or beaten by this movement. By turning the cam 78, the mixing arms may be operated either at high or low speed.

I claim:

1. A mixing machine comprising a support, a plate mounted on the upper end of said support, a forwardly extending arm and an inclined arm projecting from said plate, a casing supported between said arms, a motor mounted on said plate, a motor shaft extending into said casing, speed changing mechanism in said casing connected with said shaft, a plurality of mixing arms on both sides of said casing, connections between said arms and said speed changing mechanism, and a plurality of receptacles in which said mixing arms are adapted to operate respectively.

2. A mixing machine comprising a base plate, a standard extending upwardly from said base plate, an upper plate mounted on said standard, a forwardly extending arm and an inclined arm projecting from said plate, two posts extending up from said base plate whose upper portions are engaged respectively by the forward ends of said arms, a beam secured to the upper ends of said posts, a casing carried by said beam and located between said arms, a motor mounted on said upper plate, a motor shaft extending into said casing, speed changing mechanism in said casing connected with said shaft, a plurality of mixing arms on both sides of said casing, connections between said arms and said speed changing mechanism, and a plurality of receptacles in which said mixing arms are adapted to operate respectively.

In testimony whereof I hereunto affix my signature.

HELMER ANDERSON.